United States Patent
Werlen

(10) Patent No.: US 6,672,572 B2
(45) Date of Patent: Jan. 6, 2004

(54) PACKED COLUMN FOR EXCHANGING HEAT AND/OR MASS

(75) Inventor: Etienne Werlen, Paris (FR)

(73) Assignee: L'Air Liquide - Societe Anonyme a Directoire et Conseil de Surveillance pour l'Etude et l'Exploitation des Procedes Georges Claude, Paris Cedex (FR)

(*) Notice: Subject to any disclaimer, the term of this patent is extended or adjusted under 35 U.S.C. 154(b) by 100 days.

(21) Appl. No.: 09/949,884

(22) Filed: Sep. 12, 2001

(65) Prior Publication Data

US 2002/0050657 A1 May 2, 2002

(30) Foreign Application Priority Data

Sep. 11, 2000 (FR) .............................. 00 11516

(51) Int. Cl.⁷ ................................. B01F 3/04
(52) U.S. Cl. ...................... 261/94; 261/112.2
(58) Field of Search ................... 261/94, 97, 112.2, 261/DIG. 72

(56) References Cited

U.S. PATENT DOCUMENTS

| | | | |
|---|---|---|---|
| 3,592,613 A | * | 7/1971 | Boyd |
| 4,333,894 A | * | 6/1982 | Hoppe et al. |
| 4,405,533 A | * | 9/1983 | Norback et al. ......... 261/112.2 |
| 4,472,325 A | * | 9/1984 | Robbins ..................... 261/97 |
| 4,499,031 A | * | 2/1985 | Sexton et al. ............ 261/112.2 |
| 4,842,778 A | * | 6/1989 | Chen et al. ................... 261/97 |
| 5,132,055 A | * | 7/1992 | Alleaume et al. ............. 261/97 |
| 5,139,544 A | * | 8/1992 | Lucero et al. ................. 261/97 |
| 5,224,351 A |   | 7/1993 | Jeannot et al. |
| 6,119,481 A | * | 9/2000 | Sunder ..................... 261/112.2 |
| 6,277,340 B1 | * | 8/2001 | Paikert et al. ........... 261/112.2 |
| 6,427,985 B1 | * | 8/2002 | Kaibel et al. ............ 261/112.2 |

FOREIGN PATENT DOCUMENTS

| EP | 0 845 293 | 6/1998 |
|---|---|---|
| EP | 1 016 457 | 7/2000 |
| WO | WO 97/16247 | 5/1997 |

* cited by examiner

*Primary Examiner*—C. Scott Bushey
(74) *Attorney, Agent, or Firm*—Young & Thompson

(57) ABSTRACT

This column includes at least one exchange section (5, 9, 10, 11) defined between an associated upper liquid distributor (4, 6, 7, 8) and a lower fluid inlet/outlet (21, 23) or an associated lower liquid distributor (7, 8), the exchange section including an upper portion (5A, 9A) and, under it, another portion (5B, 9B, 10B, 11B) preferably of the conventional type. The upper packing portion of at least one packing section includes a packing module having less transfer units than a packing module of the conventional packing portion of the same section.

Application to double columns for air distillation.

11 Claims, 1 Drawing Sheet

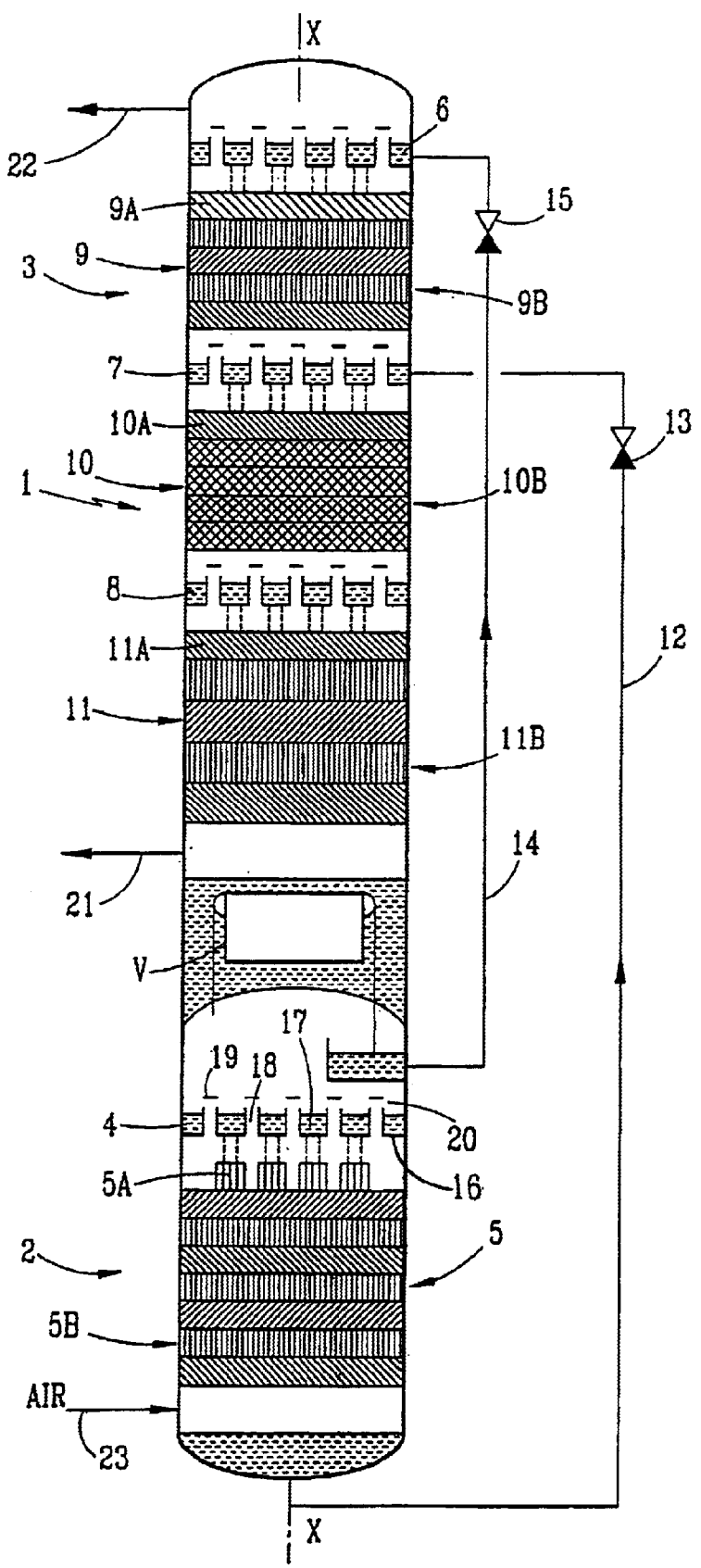

PACKED COLUMN FOR EXCHANGING HEAT AND/OR MASS

The present invention relates to a packed column for exchanging heat and/or mass between a descending liquid and a rising gas, of the type comprising at least one exchange section defined between an associated upper liquid distributor and a lower inlet/outlet for fluid or an associated lower liquid distributor, this exchange section comprising an upper portion and, below the latter, another portion. It is applicable in particular to air-distillation columns.

Here the term "packing" refers to a device designed to promote intimate contact between a descending liquid and a rising gas, so that heat and/or mass exchange can take place.

The packed portions each consist of at least one module or "pack" of packing. These modules may be of the random type, that is to say each consisting of a volume of discrete particles, but are preferably of what is known as the structured type. In this category, the following especially appear:

(1) Cross-corrugated packings, generally consisting of corrugated strips comprising parallel alternating corrugations each one arranged in a vertical general plane and one against the others, the corrugations being oblique and descending in opposite directions from one strip to the next. The degree of perforation is typically about 10% for these cross-corrugated packings.

GB-A-1 004 046 discloses packings of the cross-corrugated type, and CA-A-1 095 827 proposes an improvement on this type of packing by adding a dense arrangement of small-diameter perforations in order to allow the liquid to pass right through the cross-corrugated strips. Such a packing is generally manufactured from a flat product, namely metal sheets in the form of strips. The strips are firstly folded (or bent) so as to form a sort of corrugated metal plate in a strip, the corrugations of which are oblique with respect to the axis of the strip. The folded strips are then cut into portions and stacked, alternately turning around one band in two, so as to form modules or "packs".

(2) Ventilated packings, each module of which comprises a plurality of deflectors which define a set of horizontal layers of fixed ventilators for agitating the rising gas.

These ventilated packings are structures with a three-dimensional effect with regard to the gas which rises in the column. They ensure, by making the gas undergo multiple rotation, considerable turbulence in this gas, and the resultant agitation improves the exchange of heat and/or mass with the descending liquid.

Examples of such packings are described in WO-A-86/06 296, in WO-A-90/10 497 and in EP-A-0845 293.

The aim of the invention is to reduce the cost of packed columns for exchanging heat and/or mass.

To this end, the subject of the invention is a packed column of the aforementioned type, characterized in that the upper packed portion of at least one exchange section comprises at least one packing module which has a number of transfer units less than that of at least one packing module of the other packed portion of the same exchange section.

As is well known in the art, the number of transfer units (NTU) in the vapour phase of a packing module is the ratio of the height of the module (HM) to the height of a transfer unit in the vapour phase (HTU).

The HTU is commonly used to characterize the intrinsic efficiency of a packing, it is connected to the height equivalent to a theoretical plate (HETP) for this same packing by the equation:

$$HETP = HTU \frac{mV/L - 1}{\ln(mV/L)}$$

where

L: molar liquid flow rate (mol/s)

V: molar vapour flow rate (mol/s)

m: slope of the equilibrium line in a graph showing the molar fraction in the vapour as a function of the molar fraction in the liquid.

The HTU, and therefore the NTU, of a packing module depend to some extent on the fluids distilled and on the distillation conditions. However, when the NTUs of two packing modules are compared in this text, it is to be understood on each occasion that these two modules are placed in identical distillation conditions. In addition, to simplify matters, in this text, the number of transfer units in vapour phase will be called the number of transfer units.

The packed column according to the invention may comprise one or more of the following characteristics, taken alone or in all the technically possible combinations:

the said module of the said upper portion differs from the said module of the said other portion of the same exchange section by at least one of the following factors:

its intrinsic density;

its structure;

its mean density over the transverse section of the column; and its height;

the said factor is the mean density, and the said upper portion (5A) occupies only a fraction of the transverse section of the column, located under the jets of liquid coming from the said upper distributor;

the said packed portions are portions of structured packing;

the said upper packed portion is a portion of cross-corrugated packing, while the other packed portion is a portion of ventilated packing;

the said upper packed portion is a portion of cross-corrugated packing of relatively low density, while the other packed portion is a portion of cross-corrugated packing of higher density, the packing modules possibly being offset angularly, especially by 90°, one with respect to the others around the vertical central axis of the column;

the said upper packed portion consists of a single packing module;

the said single module has a height lower than that of the modules of the other portion of the same exchange section;

in each exchange section, the packing modules are stacked one on top of the other, directly or with the insertion of elements forming spacers;

the column is part of a double air-distillation column; and the other portion is a standard portion.

One embodiment of the invention will now be described with reference to the appended drawings, the single figure of which shows schematically in axial section a double air-distillation column according to the invention.

The double air-distillation column 1 shown in the drawing, of vertical central axis X—X, has a conventional structure with the exception of the composition of its packings. It thus consists of a medium pressure column 2 surmounted by a low pressure column 3. A main reboiler-condenser V puts the top vapour of column 2 (virtually pure nitrogen) in a heat exchange relationship with the bottom liquid (virtually pure oxygen) of column 3.

Column 2 comprises a top liquid distributor 4 and, below the latter, a single air-distillation section 5.

The column 3 comprises: a top liquid distributor 6; an upper intermediate liquid distributor 7; a lower intermediate liquid distributor 8; an upper distillation section 9 situated between the distributors 6 and 7; an intermediate distillation section 10 situated between the distributors 7 and 8; and a lower distillation section 11 situated below the distributor 8.

In operation, the air to be distilled, compressed to the medium pressure, typically about 5 bar absolute, is introduced into the bottom of the column 2. "Rich liquid" (oxygen-enriched air) collected at the bottom of this column is drawn off via a pipe 12, expanded to the lower pressure, which is about 1.2 bar absolute, in an expansion valve 13, and introduced into the distributor 7.

"Lean liquid" from the top of the column 2, consisting of liquid nitrogen, is drawn off via a pipe 14, expanded to a low pressure in an expansion valve 15 and introduced into the distributor 6. The excess liquid nitrogen condensed in the reboiler-condenser V falls down inside the distributor 4, which distributes it over the distillation section 5. In the latter, the incoming air rises and exchanges heat and mass with the reflux liquid nitrogen thereby gradually becoming leaner in oxygen.

In column 2, the rising gas is gaseous oxygen, which exchanges heat and mass with the reflux liquid. The distributor 6 distributes liquid nitrogen over the distillation section 9. The distributor 7 distributes, over the distillation section 10, the rich liquid coming from the valve 13 together with the liquid of substantially the same composition which falls from the section 9. The distributor 8 serves to redistribute, over the entire transverse section of the column 3, the reflux liquid which leaves section 10, in order to improve the distillation efficiency and to avoid the wall effect in which the liquid, after having crossed a certain height of packing, tends to trickle over the inner wall of the shell of the column.

Of course, as a variant, other distributors for redistribution, such as the distributor 8, may be provided, depending on the packing type and on the column height.

Each liquid distributor 4, 6, 7, 8 comprises a peripheral duct 16 and several parallel ducts with a U-shaped section 17 which open at each end into the duct 16. Parallel channels 18 are defined between the ducts 16 for the passage of the rising gas, the channels being closed by a horizontal upper wall 19. Just under this wall, rows of windows 20 are made. The bottom of the ducts 17 is perforated, which defines a large number of vertical jets of liquid under each of these ducts.

The double column 1 also comprises at least one product outlet such as a pipe 21 for drawing off gaseous oxygen from the bottom of the column 3, located just under the section 11, and a pipe 22 for drawing off waste gas (impure nitrogen) which leaves the top of the column 3. The air inlet pipe at the bottom of the column 2 is indicated by 23.

Each of the distillation sections 5, 9, 10, 11 consists of a stack of structured packing modules. The upper module constitutes the upper portion 5A, 9A, 10A, 11A of the section, while the other modules form the standard portion 5B, 9B, 10B, 11B of the section. The modules are stacked either directly one on top of the other, or with insertion of elements forming spacers.

Each upper portion consists of a packing module or "pack", more particularly suited to the uniform distribution, over the entire transverse section of the column, of the liquid which it receives from the distributor which feeds it, while the modules of every other portion are more particularly suited to carrying out high-efficiency heat and/or mass exchange between this liquid and the rising gas.

Thus, the following examples can be provided:

(1) The upper portion may be of the same type as the other portion but with a lower intrinsic density ($m^2$ of metal/$m^3$). The function of spreading the liquid is then fulfilled more cheaply since the amount of metal used is smaller.

(2) The upper portion may be of a different type to the other portion, namely of lower efficiency from the distillation point of view and cheaper. In particular, the upper portion may be of the cross-corrugated type, especially with low density, while the standard portion is of the ventilator type.

(3) The upper portion may be a packing module, the height of which is smaller than that of the modules of the lower portions. In this way, the column height is reduced without substantially penalizing the overall efficiency of the distillation, since the upper portion is not fully efficient.

(4) It is possible for the upper portion not to extend over the entire transverse section of the column. In particular, it may be limited to the regions which receive the jets of liquid from the associated distributor. In this case, the upper portion, for an identical type, has a mean density lower than that of the standard portion.

These various possibilities may be combined together. In addition, in the cases (1) and (2), the upper portion may consist of more than one packing module.

In each of the cases above, the upper portion has, for each of its modules, a number of transfer units lower than that of each module of the other portion.

This is because:

In Case (1): the reduction in the intrinsic density reduces the number of transfer units for a given height of the modules.

In Case (2): by definition, the lower distillation efficiency corresponds to a lower number of transfer units.

In Case (3): the reduction in the height of a module reduces its number of transfer units.

The Case (4): removing part of the active section of a module reduces its number of transfer units.

In the example shown in the drawing, the upper portion of each distillation section is a single cross-corrugated packing module.

The upper portion 5A of the section 5 is discontinuous. It consists of several parallel strips, each one of which is situated below a corresponding duct 17 of the distributor 4. The other portion 5B is a standard portion consisting of a stack of cross-corrugated packing modules. The modules of section 5 are offset angularly by 90° one with respect to the others around the axis X—X.

The portion 9B of the section 9 is a standard portion consisting of a stack of cross-corrugated packing modules, the density of which is greater than that of the upper portion 9A. The modules of the section 9 are offset angularly by 90° one with respect to the others about the axis X—X.

The portion 10B of the section 10 is a standard portion consisting of a stack of packing modules of the ventilator type. These modules are offset angularly by 90° one with respect to the others around the axis X—X.

The portion 11B of the section 11 is a standard portion consisting of a stack of cross-corrugated packing modules of the same density as the upper portion 11A, but with a greater height than the latter. The modules of section 11 are also offset angularly by 90° one with respect to the others around the axis X—X.

What is claimed is:

1. A packed column for exchanging heat and/or mass between descending liquid and a rising gas, comprising:

at least one exchange section defined between an associated upper liquid distributor and one of a lower inlet/outlet for fluid and an associated lower liquid distributor, said at least one exchange section comprising an upper portion and another portion below said upper portion, each of said upper portion and said another portion comprising at least one structure packing module, wherein said structured packing module of said upper portion has a number of transfer units less than that of said structured packing module of said another portion and structure different from that of said structured packing module of said another portion.

2. The packed column of claim 1, wherein the structure of said structured packing module of said upper portion also differs from that of said structured packing module of said another portion by at least one of intrinsic density, mean density over a transverse section of the column, and height.

3. The packed column of claim 2, wherein the mean density over a transverse section of the column of said structured packing module of said upper portion differs from that of said structured packing module of said another portion, and wherein said upper portion occupies only a fraction of the transverse section of the column and is located under jets of liquid coming from said associated upper liquid distributor.

4. The packed column of claim 1, wherein said structured packing module of said upper portion comprises cross-corrugated packing and said structured packing module of said another portion comprises ventilated packing.

5. The packed column of claim 1, wherein said upper portion consists of only a single said structured packing module.

6. The packed column of claim 5, wherein said single structured packing module has a height lower than that of said structured packing module of said another portion.

7. The packed column of claim 1, wherein said structured packing modules of said upper and another portions are stacked directly one on top of the other.

8. The packed column of claim 1, wherein said structured packing modules of said upper and another portions are stacked on top of the other with spacers therebetween.

9. The packed column of claim 1, wherein the column is a double air-distillation column.

10. A packed column for exchanging heat and/or mass between a descending liquid and a rising gas, comprising:

an exchange section between an associated upper liquid distributor a one of a lower inlet/outlet for fluid and an associated lower liquid distributor, said exchange section comprising an upper packing module with cross-corrugated packings that receives a liquid directly from aid upper liquid distributor and a lower packing module with ventilated packings below said upper packing module, wherein said upper packing module has a number of transfer units less than that of said lower packing module.

11. The packed column of claim 10, wherein said upper packing module comprises plural parallel strips with gaps therebetween and said upper liquid distributor comprises plural ducts with channels therebetween, and wherein said gaps are aligned directly beneath associated ones of said channels.

* * * * *